(12) United States Patent
Raj

(10) Patent No.: US 10,146,584 B2
(45) Date of Patent: Dec. 4, 2018

(54) WEIGHT ADJUSTED DYNAMIC TASK PROPAGATION

(71) Applicant: CA, INC., New York, NY (US)

(72) Inventor: Apurv Raj, Hyderabad (IN)

(73) Assignee: CA, Inc., New York, NY (US)

( * ) Notice: Subject to any disclaimer, the term of this patent is extended or adjusted under 35 U.S.C. 154(b) by 150 days.

(21) Appl. No.: 15/008,509

(22) Filed: Jan. 28, 2016

(65) Prior Publication Data

US 2017/0220382 A1    Aug. 3, 2017

(51) Int. Cl.
*G06F 9/50* (2006.01)
*H04L 29/08* (2006.01)

(52) U.S. Cl.
CPC .......... *G06F 9/505* (2013.01); *H04L 67/1004* (2013.01); *H04L 67/1008* (2013.01); *G06F 2209/502* (2013.01); *G06F 2209/5019* (2013.01); *G06F 2209/5022* (2013.01); *H04L 67/34* (2013.01)

(58) Field of Classification Search
None
See application file for complete search history.

(56) References Cited

U.S. PATENT DOCUMENTS

| 6,470,375 | B1 | 10/2002 | Whitner et al. | |
|---|---|---|---|---|
| 7,152,125 | B2* | 12/2006 | Garney | G06F 9/5027 700/3 |
| 8,126,134 | B1 | 2/2012 | Fama | |
| 8,479,206 | B2 | 7/2013 | Guccione et al. | |
| 8,959,226 | B2* | 2/2015 | Arrowood | H04L 67/1002 370/398 |
| 2005/0132032 | A1* | 6/2005 | Bertrand | H04L 43/0817 709/223 |
| 2006/0048157 | A1* | 3/2006 | Dawson | G06F 9/5072 718/104 |
| 2014/0137104 | A1 | 5/2014 | Nelson et al. | |
| 2014/0244643 | A1* | 8/2014 | Basak | G06F 17/3071 707/737 |

* cited by examiner

*Primary Examiner* — Lewis A Bullock, Jr.
*Assistant Examiner* — Bruce S Ashley
(74) *Attorney, Agent, or Firm* — Sage Patent Group

(57) ABSTRACT

A method of assigning data processing tasks to workload agents includes receiving workload parameters that relate to available capacities of a plurality of workload agents, identifying a primary workload agent based on at least one of the workload parameters; identifying a plurality of candidate secondary workload agents; identifying a secondary workload agent based on the plurality of workload parameters; and transmitting a job message that contains a command for the primary workload agent to perform a data processing task. The job message includes a forwarding map that identifies the secondary workload agent, and contains a command for the primary workload agent to perform the data processing task using resources of the secondary workload agent.

16 Claims, 10 Drawing Sheets

WEIGHT ADJUSTED DYNAMIC TASK PROPAGATION

BACKGROUND

The present disclosure relates to data processing systems, and in particular, to the scheduling of jobs in data processing systems.

Data processing systems utilize scheduling engines to schedule execution of computer processes. Scheduling the execution of computer processes is often referred to as job management, which may involve scheduling a computer process to occur at one designated time, repeatedly at periodic times, or according to other time schedules. Numerous scheduling engines exist today, such as Unicenter CA-7, Unicenter CA-Scheduler, and Unicenter CA-Job track available from Computer Associates.

In a distributed computing platform that includes many different data processing devices, such as a multi-server cluster, job scheduling is an important task. Distributed computing platforms typically include software that allocates computing tasks across a group of computing devices, enabling large workloads to be processed in parallel.

Cloud computing/storage environments have become a popular choice for implementing data processing systems. In a cloud computing/storage environment, a cloud provider hosts hardware and related items and provides systems and computational power as a service to a customer, such as a business organization.

Cloud computing/storage environments may support virtual machines (VM), which are emulations of physical machines implemented in software, hardware, or combination of both software and hardware. In a cloud computing environment, jobs may be delegated to virtual machines. Virtual machine resources may be scheduled in a similar manner as physical machine resources. Thus, a distributed computing platform may consist of physical machines, virtual machines, or a collection of both physical and virtual machines.

Entities to which tasks, or jobs, are assigned by a scheduler are generally referred to as "agents" or "workload agents," and may reside on physical machines and/or virtual machines.

SUMMARY

Some embodiments of the present disclosure are directed to a method of assigning data processing tasks to workload agents. The method includes receiving a plurality of workload parameters from a plurality of workload agents, wherein the workload parameters relate to available capacities of the plurality of workload agents and wherein the workload agents comprise computing nodes configured to perform data processing tasks; identifying a primary workload agent from the plurality of workload agents based on at least one of the plurality of workload parameters; identifying a plurality of candidate secondary workload agents from among the plurality of workload agents; identifying a secondary workload agent from among the plurality of candidate secondary workload agents based on the plurality of workload parameters; and transmitting a job message that contains a command for the primary workload agent to perform a data processing task, wherein the job message includes a forwarding map that identifies the secondary workload agent and that enables the primary workload agent to perform the data processing task using resources of the secondary workload agent.

The plurality of workload parameters may include a workload capacity, and identifying the primary workload agent from among the plurality of workload agents may include determining which of the plurality of workload agents has a lowest workload capacity.

Identifying the plurality of candidate secondary workload agents may include determining path lengths from the primary workload agent to the plurality of workload agents based on a number of communication nodes between the primary workload agent and each of the plurality of workload agents, and selecting workload agents having a path length to the primary workload agent that is less than a threshold path length as the candidate secondary workload agents.

Identifying the secondary workload agent may include evaluating a selection function that mathematically evaluates the workload parameters. The selection function may include a weight adjusted function of the plurality workload parameters.

The plurality of workload parameters may include an available CPU metric, an available memory metric, an available workload capacity metric, and/or an available throughput metric.

Evaluating the selection function may include selecting a workload agent from among the candidate secondary workload agents that maximizes a weight adjust factor (WAF) output by a function having the form:

$$WAF = \sqrt{\frac{w_1 M_1^2 + w_2 M_2^2 + w_3 M_3^2 + \ldots + w_N M_N^2}{w_1 + w_2 + w_3 + \ldots + w_N}}$$

where $M_1 \ldots M_N$ are workload parameters, $w_1 \ldots w_N$ are weights assigned to the respective workload parameters.

In some embodiments, identifying the candidate secondary workload agents comprises identifying workload agents for which each of the workload parameters is greater than a respective threshold level.

In further embodiments, identifying the candidate secondary workload agents comprises identifying workload agents for which $Mn > Mn,t$ for each of N workload parameters, where Mn is the value of the nth workload parameter of the workload agent, and Mn,t is the threshold level for the nth workload parameter.

In still further embodiments, identifying the plurality of candidate secondary workload agents may further include receiving job workload information relating to the data processing task to be assigned to the primary workload agent, and selecting the candidate secondary workload agents in response to the job workload information.

The job workload information may characterize a level of resources required by the data processing task that is to be assigned to the primary workload agent.

Identifying the candidate secondary workload agents may include selecting only those workload agents of the plurality of workload agents that have sufficient resources to perform the data processing task that is to be assigned to the primary workload agent.

The method may further include identifying a plurality of candidate tertiary workload agents from among the plurality of workload agents; and identifying a tertiary workload agent from among the plurality of candidate tertiary workload agents based on the plurality of workload parameters. The forwarding map identifies the secondary workload agent and the tertiary workload agent, and the job message contains a command for the primary workload agent to perform the data processing task using resources of the secondary workload agent and the tertiary workload agent.

A computer system according to some embodiments includes a processor; and a memory coupled to the processor. The memory includes computer readable program code embodied therein that, when executed by the processor, causes the processor to perform operations including receiving a plurality of workload parameters from a plurality of workload agents, wherein the workload parameters relate to available capacities of the plurality of workload agents; identifying a primary workload agent from the plurality of workload agents based on at least one of the plurality of workload parameters; identifying a plurality of candidate secondary workload agents from among the plurality of workload agents; identifying a secondary workload agent from among the plurality of candidate secondary workload agents based on the plurality of workload parameters; and transmitting a job message that commands the primary workload agent to perform a data processing task, wherein the job message includes a forwarding map that identifies the secondary workload agent and that enables the primary workload agent to perform the data processing task using resources of the secondary workload agent.

Other methods, devices, and computers according to embodiments of the present disclosure will be or become apparent to one with skill in the art upon review of the following drawings and detailed description. It is intended that all such methods, mobile devices, and computers be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
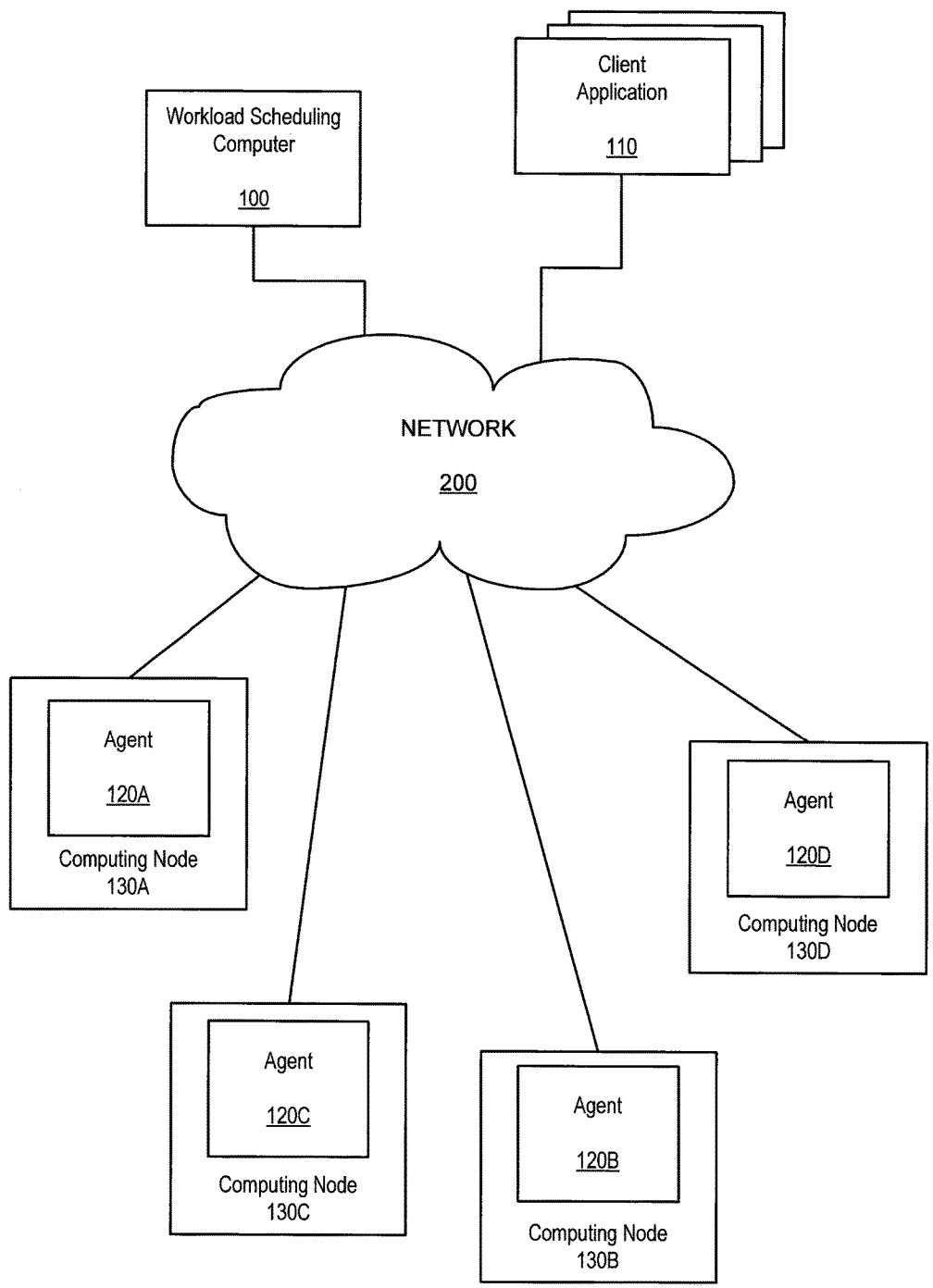
FIG. 1 is a block diagram illustrating a network environment in which embodiments according to the inventive concepts can be implemented.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As discussed above, in a distributed computing environment, a scheduler may assign various tasks to one or more workload agents. Workload agents, whether they are implemented in physical or virtual machines, have a finite capacity for handling assigned workloads based on the amount of resources, such as processor capacity, memory, bandwidth, etc., available to the workload agent. Moreover, the resources available to a virtual agent may change dynamically, as the resources may be shared by other virtual machines hosted on the same physical server as the agent.

Conventionally, if a scheduler assigns a job to a workload agent and the workload agent does not have capacity to perform the job, either the job will be queued until the workload agent has capacity or the workload agent will return an error in response to the assignment. In either case, execution of the job is delayed, and the scheduler may incur additional overhead associated with the job.

Embodiments of the inventive concepts provide systems/methods that enable a workload agent to forward a job to another workload agent in the event the forwarding workload agent does not have capacity to perform the job. This may enable the forwarding workload agent to share the workload if agent's computing capacity is exceeded. This in turn enables workload agents to scale their capacity in a scheduler-agent environment without disrupting operation of the scheduler by increasing the overhead load on the scheduler.

According to some embodiments, a workload agent to which a job has been assigned can propagate the workload to another workload agent in the scheduler-agent network when the capacity of the workload agent is exceeded. The capacity of the workload agent may be measured by workload parameters, such as CPU utilization, memory utilization, load factor, etc. The workload agent may periodically register its workload parameters to a broker component of a scheduler. Each of the performance factors can be weighted based on the relative importance of the factor to the capacity of the workload agent to handle a job.

The broker component monitors the workload parameters of each of the workload agents, and, when the workload parameters indicate that a particular agent (a "primary workload agent") is becoming overloaded, the broker may send key-value information to the primary workload agent identifying a secondary workload agent that can be used by the first agent to perform the assigned job.

In some embodiments, the primary workload agent may forward an unperformed job, which may be a new job, or a queued job waiting to be performed, to the secondary workload agent identified by the key-value information provided by the broker. In that case, the primary workload agent may act as a message intermediary for the secondary workload agent. However, the scheduler is relieved of the overhead associated with re-assigning the job to a different workload agent.

FIG. 1 is a block diagram of a distributed computing environment in which systems/methods according to embodiments of the inventive concepts may be employed. Referring to FIG. 1, a plurality of computing nodes 130 are provided. The computing nodes may be physical devices, such as servers that have processors and associated resources, such as memory, storage, communication interfaces, etc., or virtual machines that have virtual resources assigned by a virtual hypervisor. The computing nodes communicate over a communications network 200, which may be a private network, such as a local area network (LAN) or wide area network (WAN), or a public network, such as the Internet. The communications network may use a communications protocol, such as TCP/IP, in which each network node is assigned a unique network address, or IP address.

Each of the computing nodes 130 may host one or more workload agents 120 (or simply agents 120), which are software applications configured to process jobs assigned by a workload scheduling computer 100. The workload scheduling computer 100 may be referred to herein as a "workload scheduler," or more simply a "scheduler" 100. In the distributed computing environment illustrated in FIG. 1, jobs are requested by client applications 110. A job request may be sent by a client application 110 to the scheduler 100. The scheduler 100 in turn distributes the job to one of the available workload agents 120 based on one or more parameters.

A workload agent 120, such as workload agent 120A, may receive a job assignment from the scheduler 100, perform the job, and return a result of the job to the scheduler 100, or alternatively to the client application 110 that requested the job. In other embodiments, the client application may submit the job to a job manager (not shown), that may split the job into a plurality of sub-tasks, and request the scheduler 100 to assign each of the individual sub-tasks to one or more workload agents for completion.

Figure 2:
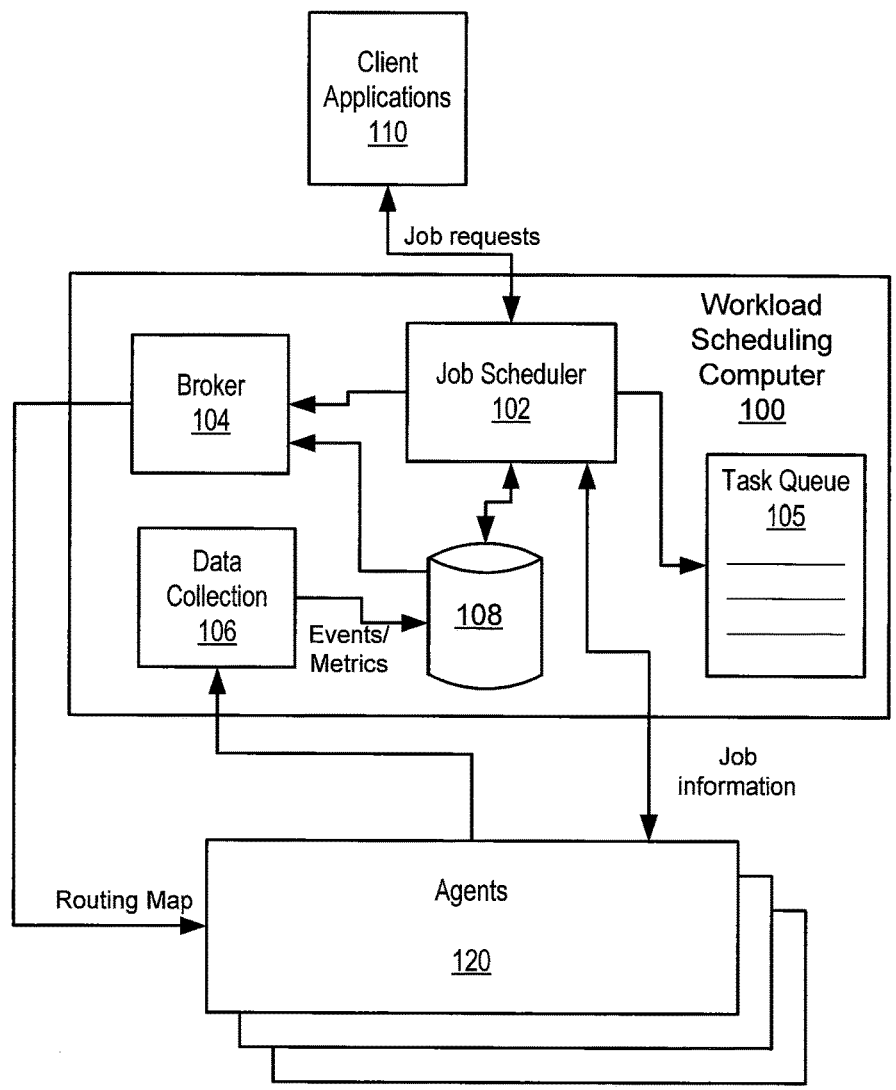
FIG. 2 is a block diagram of a workload scheduling computer according to some embodiments of the inventive concepts.

FIG. 2 is a block diagram of a workload scheduling computer 100 according to some embodiments showing components of the workload scheduling computer 100 in more detail. The workload scheduling computer 100 includes various components that communicate with one another to perform the workload scheduling function. For example, the workload scheduling computer 100 includes a job scheduler component 102, a task queue 105, a database 108, a broker component 104, and a data collection component 106. It will be appreciated that the workload scheduling computer 100 may be implemented on a single physical or virtual machine, or its functionality may be distributed over multiple physical or virtual machines. Moreover, the database 108 may be located in the workload scheduling computer 100 or may be accessible to the workload scheduling computer 100 over a communication interface.

Client applications 110 submit job requests to the workload scheduling computer 100. The job requests are forwarded to the job scheduler component 102 for processing. The job scheduler component 102 uses the task queue to keep track of the assignment and status of jobs. The job scheduler transmits job information to workload agents 120 for processing, and may also store information about jobs in the database 108.

Information about the status of workload agents, such as the available workload capacity of workload agents, is collected by the data collection component 106 and stored in the database 108, which is accessible to both the job scheduler 102 and the broker component 104. The data collection component 106 also collects information about events relating to jobs and metrics provided by workload agents and stores such information in the database 108. The job-related events may include job status information (queued, pending, processing, completed, etc.) and/or information about the workload agents, such as whether a workload agent is available for scheduling, is being taken offline, etc.

According to some embodiments, the broker component 104 provides routing map information directly to the workload agents 120. The routing map information may be provided along with job information or independent from the job information. As will be discussed in more detail below, the routing map information identifies secondary, tertiary, and possibly other workload agents to which jobs should or may be forwarded by a workload agent, acting in that case as a primary workload agent.

Figure 3:
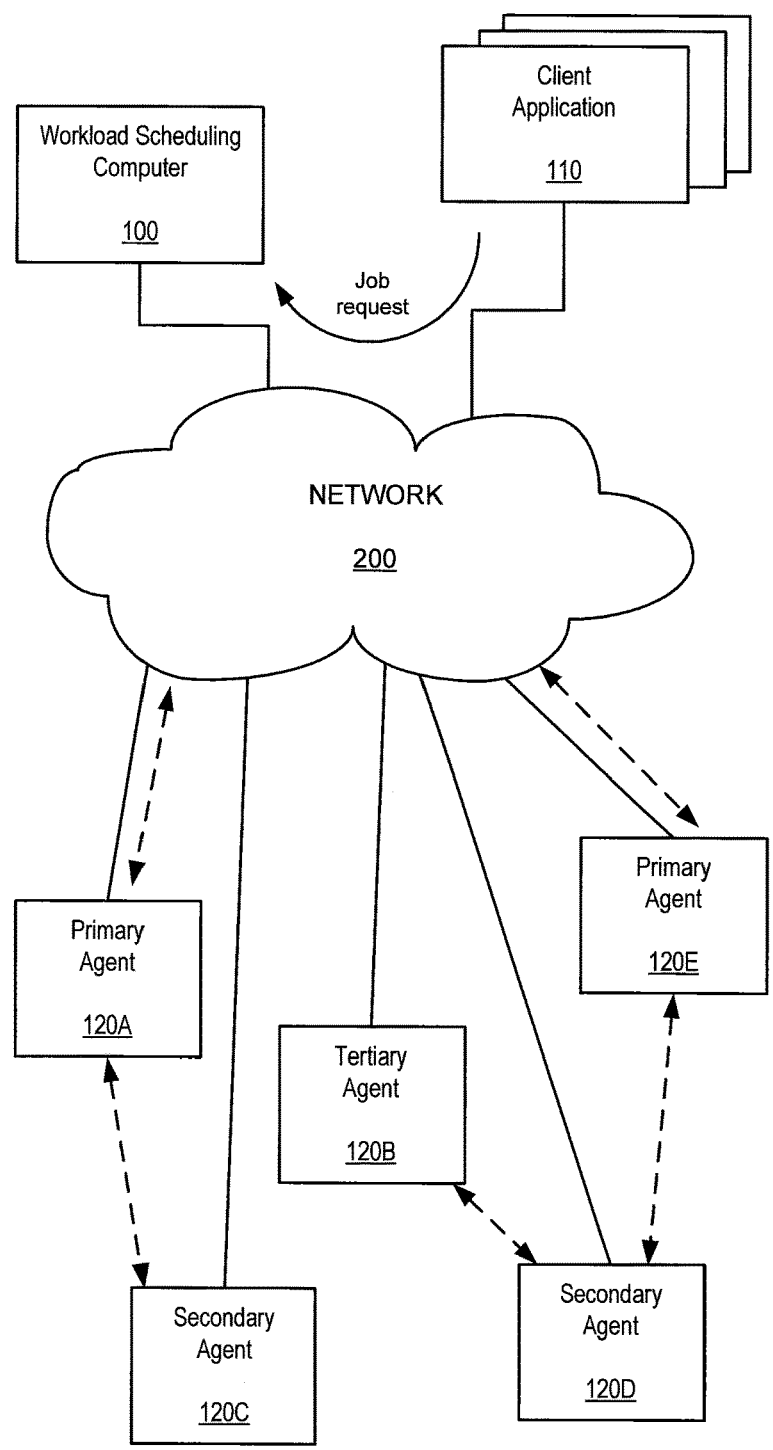
FIG. 3 is a block diagram illustrating workload scheduling according to some embodiments of the inventive concepts.

FIG. 3 is a block diagram illustrating the use of routing maps to forward jobs in a distributed computing environment according to some embodiments. Referring to FIGS. 2 and 3, a client application 110 sends a job request to the workload scheduling computer 100. The job scheduler component 102 of the workload scheduling computer 100 receives the job request and consults the task queue to determine which workload agents are available to perform the job. The job scheduler component 102 selects a workload agent 120 to perform the job, and may transmit job information directly to the selected agent. The selected agent in this case is referred to as the primary workload agent.

Figure 9:
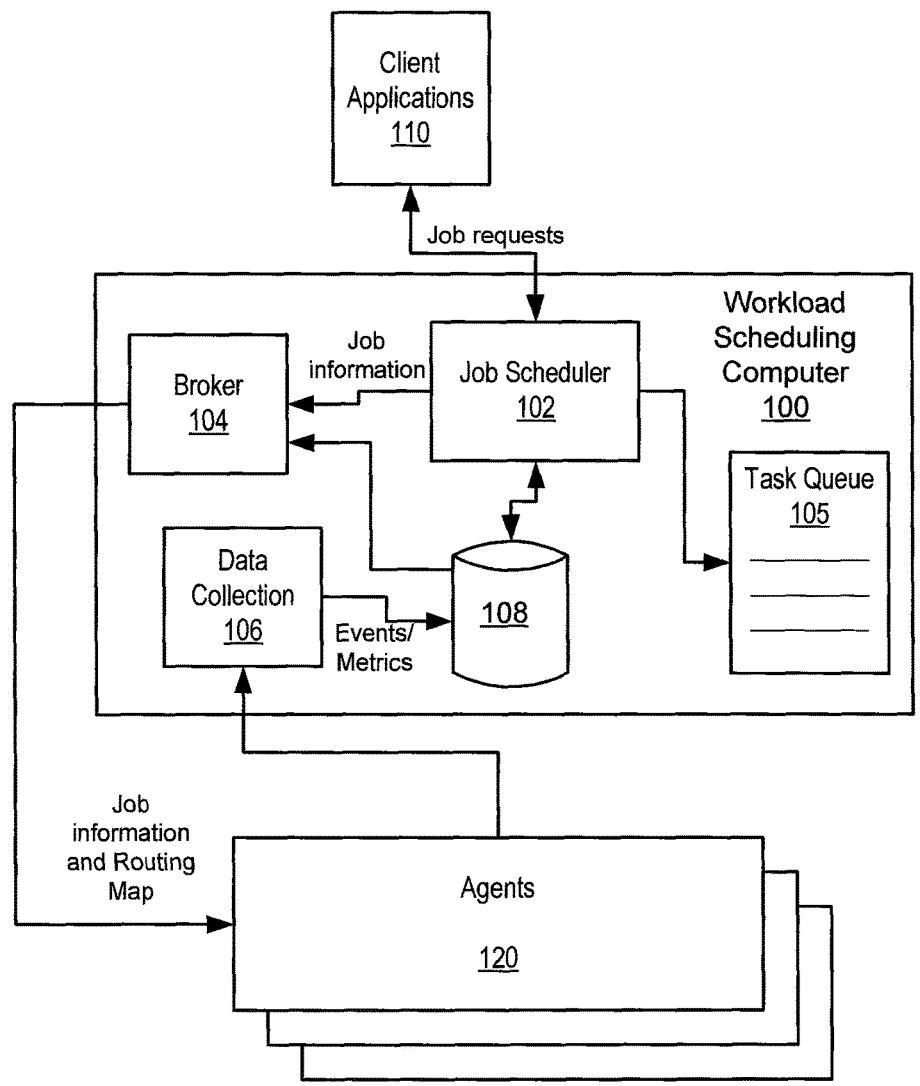
FIGS. 9 and 10 are block diagrams of workload scheduling computers according to further embodiments of the inventive concepts.

The job scheduler component 102 may also transmit the job information to the broker component 104, which forwards a routing map to the primary workload agent 120 as discussed in more detail below. In some embodiments (illustrated in FIG. 9), the broker component 104 receives the job information from the job scheduler component 102 and sends the routing map to the primary workload agent together with the job information.

Figure 10:
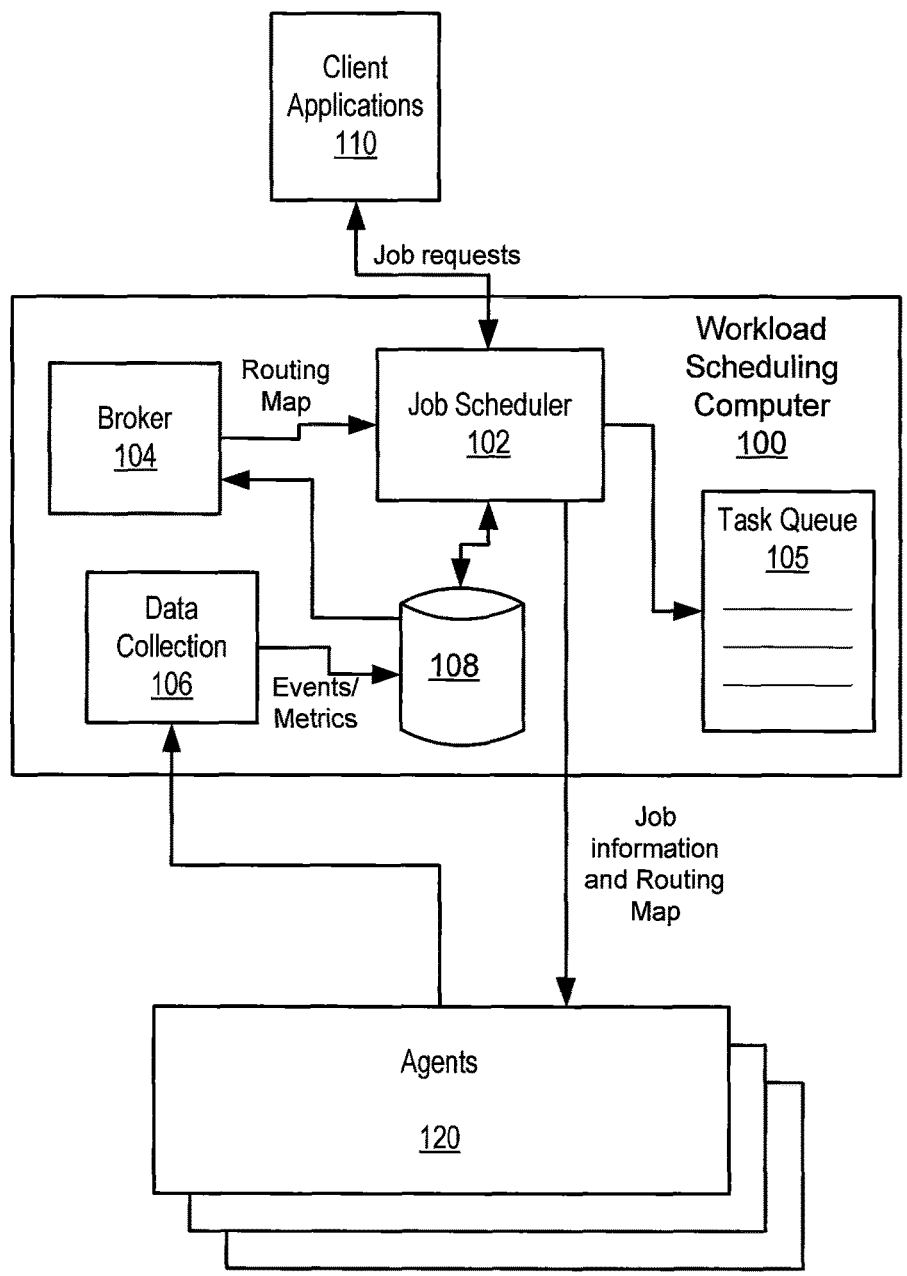

In still other embodiments (illustrated in FIG. 10), the broker component 104 may transmit the routing map to the job scheduler component 102, and the job scheduler component 102 sends the routing map to the primary workload agent together with the job information.

Referring again to FIG. 3, the routing map transmitted to the primary workload agent 120A (along with the job information or separately from the job information), may identify a secondary workload agent 120C to which the primary workload agent 120A can or must forward the job for execution. That is, in some embodiments, the primary workload agent 120A acts as a "dumb terminal" and simply forwards the job to the secondary workload agent 120E identified in the routing map upon receipt of the routing map. In other embodiments, the primary workload agent 120A may forward the job to the secondary workload agent 120E on an as needed basis, such as when the primary workload agent 120A determines that it does not have the resources to complete a job, when the primary workload agent determines that it is going down due to an exception, or in other conditions.

In some embodiments, the routing map may identify a tertiary agent to which the secondary workload agent can or shall forward the job for execution. For example, as shown in FIG. 3, job information and a routing map may be transmitted by the workload scheduling computer 100 to a primary workload agent 120E. The routing map may identify a secondary workload agent 120D to which the primary workload agent 120E can or shall forward the job, and may also identify a tertiary agent 120B to which the secondary workload agent 120D can or shall forward the job for execution.

In this manner, the workload agents may scalably extend their resources without additional intervention of the workload scheduling computer 100. The approach described herein may help in attempts to optimize the capacity of a multi-agent environment. As will be discussed in more detail below, routing maps may be generated based on available workload agent capacities as well as job parameters.

The routing map may be transmitted to the primary workload agent 120 using a frame based protocol that utilizes the services of a reliable two-way streaming network protocol, such as transmission control protocol (TCP). The workload scheduling computer 100 may communicate with the workload agents 120 using frames sent over the stream. A frame transmitted by the workload scheduling computer 100 to a workload agent may have a structure as follows:

| Frame: | Header<EOL> |
| | Command<EOL> |
| | Payload<Null Octet> |

In this structure, the header may include a date stamp, a message ID, and may identify the sender and the receiver of the frame. In particular embodiments, the header may have the following structure, although the structure may vary by implementation:

Header: <DATE-TIME><space><TO><space><FROM><space><MessageID>

The command may specify and action and optionally a sub-action. In particular embodiments, the command may have the following structure, although the structure may vary by implementation:

Command: <Action><space><Sub-Action>

The payload may be formatted in a key:value structure. In particular, the payload may include a plurality of key:value combinations, where each combination is terminated by a termination character, such as an <EOL> character. The frame may be terminated with a NULL octet, represented by "^@" in ASCII.

In particular embodiments, the payload may have the following structure, although the structure may vary by implementation:

| Payload: | <key:value><EOL> |
| | <key:value><EOL> |
| | ... |
| | <key:value>^@ |

Initially, a workload agent can register with a workload scheduling computer 100 to let the workload scheduling computer know that it is available to handle jobs. The workload scheduling computer can then send a message to the workload agent to subscribe the workload agent to a particular scheduler. For example, a workload scheduling computer 100 (SERVER1) may send a subscription request to a workload agent (AGENT1) by sending a request message as follows:

```
20150708T18:33:11.234+00:00 AGENT1 SERVER1 MESSAGE1.0234
REQUEST SUBSCRIBE_SCH
SCHEDULER_ID:SERVER1
SCHEDULER_ADDRESS:HOST1
SCHEDULER_PORT:8999^@
```

This message identifies the sender (SERVER1), and the receiver (AGENT1) in the header. The message contains a command ("REQUEST SUBSCRIBE_SCH"), and identifies the scheduler ID ("SCHEDULER_ID"), scheduler address ("SCHEDULER_ADDRESS") and scheduler port ("SCHEDULER_PORT") from which the workload agent will receives job requests.

The workload agent can respond back using a message indicating that the request is complete, as follows:

```
20150708T18:33:11.236+00:00 SERVER1 AGENT1 MESSAGE1.0234
RESPONSE STATE
STATUS:COMPLETE^@
```

Note that the message identifies the message ("MESSAGE1.0234") to which the response is provided. Once the workload agent has been subscribed, the workload scheduling computer 100 can send a request to the workload agent to perform a job, such as running a task. As an example, the workload scheduling computer 100 could send a command to the workload agent as follows:

```
20150708T18:33:11.534+00:00 AGENT1 SERVER1 MESSAGE1.0235
REQUEST EXEC
JOB_TYPE:COMMAND
CMD_NAME:CPUTest
CMD_ARGS:"-benchmark mode1 -time 6"^@
```

This message includes a command ("REQUEST EXEC") that requests the workload agent to execute an action identified by a job type ("JOB_TYPE"), which in this case is a COMMAND. Arguments for the command are given as key:value pairs in the payload as command name ("CMD_NAME"), which is "CPUTest", with command arguments ("CMD_ARGS") specified as "-benchmark mode1-time 6".

Upon receipt of the job request, the workload agent would perform the assigned task and respond with a message indicating that the job is complete, such as the following:

```
20150708T18:33:11.542+00:00 SERVER1 AGENT1 MESSAGE1.0235
RESPONSE STATE
STATUS:COMPLETE^@
```

Assuming that AGENT1 has reached a threshold capacity based on capacity reports provided to the data collection component 106 of the workload scheduling computer 100, the next task request sent by the workload scheduling computer 100 may include a forwarding map instructing or permitting the workload agent to forward the workload to a secondary workload agent. The forwarding map may identify the primary workload agent, the host address of the primary workload agent and the port of the primary workload agent, along with the secondary workload agent, the host address of the secondary workload agent and the port of the secondary workload agent. The forwarding map may have the form: FORWARD_MAP:{{"AGENT_ID":"<ID of primary workload agent>", "AGENT_ADDRESS":"<address of primary workload agent>", "AGENT_PORT":<port of primary workload agent>};{"AGENT_ID":"<ID of secondary workload agent>", "AGENT_ADDRESS":"<address of secondary workload agent>", "AGENT_PORT": <port of secondary workload agent>}}

For example, if a primary workload agent (AGENT1) has reached a threshold capacity, the broker component 104 of the workload scheduling computer 100 may identify a secondary workload agent (AGENT2) that can handle a job assigned to the primary workload agent. The next job request sent from the workload scheduling computer 100 to the primary workload agent may have the following form:

```
20150708T18:33:11.534+00:00 AGENT1 SERVER1 MESSAGE1.0235
REQUEST EXEC
JOB_TYPE:COMMAND
CMD_NAME:CPUTest
CMD_ARGS:"-benehmark model -time 6"
FORWARD_MAP:{{"AGENT_ID":"Agent1",
"AGENT_ADDRESS":"Host2",
"AGENT_PORT":5999}:{"AGENT_ID":"Agent2",
"AGENT_ADDRESS":"Host3", "AGENT_PORT":6999}}`@
```

The forwarding map is included in the payload of the message in a key:value format. The forwarding map can include a chain of additional agents (tertiary, quaternary, etc.) in addition to the primary and secondary workload agents. For example, a forwarding map may have a sequence such as: {{"AGENT_ID":"Agent1", "AGENT_ADDRESS":"Host2", "AGENT_PORT":5999}: {"AGENT_ID":"Agent2", "AGENT_ADDRESS": "Host3", "AGENT_ PORT":6999}, {"AGENT_ID": "Agent2", "AGENT_ADDRESS": "Host3", "AGENT_PORT": 6999}: {"AGENT_ID":"Agent3", "AGENT_ADDRESS":"Host4", "AGENT_PORT":9999}, ... } where the pattern {{agent1}:{agent2},{agent2}:{agent3}, ... } indicate that the message may be propagated from agent1 to agent2, from agent2 to agent3 and so on.

In some embodiments, once the primary workload agent reads the "FORWARD_MAP" key in the payload message, the primary workload agent will parse the expression and immediately forward the request to the next workload agent in the forwarding map.

Upon receipt of the request, the secondary workload agent (AGENT2) identifies that it is the target agent by looking at the FORWARD_MAP and executes the job. The secondary workload agent sends the response back to the primary workload agent in a message including a reverse map identified by the payload key REVERSE_MAP. For example, the secondary workload agent may send a message such as the following to the primary workload agent:

```
20150708T18:33:11.542+00:00 AGENT1 AGENT2 MESSAGE1.0235
RESPONSE STATE
STATUS:COMPLETE
REVERSE_MAP:{{"AGENT_ID":"Agent1",
"AGENT_ADDRESS":"Host2",
"AGENT_PORT":5999}:{"AGENT_ID":"Agent2",
"AGENT_ADDRESS":"Host3", "AGENT_PORT":6999}}`@
```

The primary workload agent reads the reverse map and header, and forwards the response to the workload scheduling computer 100. The reverse map may be traced back in reverse order without the need for ordering the map for back propagation of the response. That is, the format {{agent1}: {agent2}, {agent2}: {agent3} } may be interpreted as instructing message propagation from agent3 to agent2, and from agent2 to agent1, based on the REVERSE_MAP key.

Referring again to FIG. 2, the broker component 104 of the workload scheduling computer 100 may monitor the capacities of the subscribed workload agents, and may determine that a secondary workload agent should be assigned to a particular workload agent for the performance of a particular task. In particular, the broker component may receive a plurality of workload parameters from a plurality of workload agents. The workload parameters relate to available capacities of the plurality of workload agents, and may include parameters such as workload capacity, available CPU percentage, available memory, and/or available throughput. The parameters may be indicated by metrics, which may be absolute, relative, percentage, or any other suitable measure.

In this context, "workload capacity" means how many jobs can be processed by system in a given unit of time while maintaining a predetermined quality of service, such as a predetermined response time. For example, a particular workload agent can process 100 incoming jobs per second (i.e., 6000 jobs/hour or 144,000 jobs/day) while meeting a predetermined response deadline for each job, then workload capacity of the agent is at least 100 jobs per second.

The workload parameters may be collected by the data collection component 106 of the workload scheduling computer 100, and stored in the database 108, from which they can be accessed by the broker component 104 and/or the job scheduler component 102.

When a job is to be scheduled, the broker component 104 may identify a primary workload agent from the plurality of subscribed workload agents based on one or more of the plurality of workload parameters. The broker component 104 may also identify a plurality of candidate secondary workload agents from among the plurality of workload agents.

The broker component 104 may then identify a secondary workload agent from among the plurality of candidate secondary workload agents based on the plurality of workload parameters. Once the secondary workload agent has been identified, the job scheduler 102 or the broker component 104 builds a forwarding map to be transmitted to the primary workload agent along with a job request.

The broker component 104 may then transmit a job scheduling message that contains a command for the primary workload agent to perform a data processing task. The job scheduling message includes a forwarding map that identifies the secondary workload agent. By including the forwarding map in the job request, the job message contains a command for the primary workload agent to perform the data processing task using resources of the secondary workload agent.

To determine whether to include a forwarding map with a job request, the broker component may identify which of the workload agents has a workload capacity below a predefined threshold. Thus, when a job is sent to one of the workload agents having a workload capacity below the threshold, the job request may include a forwarding map. In other embodiments, a forwarding map may be included with each job request.

The candidate secondary workload agents may be identified in part by determining path lengths from the primary workload agent to the plurality of workload agents. Path length may be determined in a number of ways. For example, path length may be determined based on a number of communication nodes between the primary workload agent and each of the plurality of workload agents, based on a bandwidth of communication channels between the primary workload agent and each of the plurality of workload agents, based on a round trip time (RTT) of messages between the primary workload agent and each of the plurality of workload agents, or other ways. Essentially, the best candidate secondary workload agent may be the workload agent that has the shortest communication path with the primary workload agent.

The candidate secondary workload agents may be selected as those workload agents that have a path length to the primary workload agent that is less than a threshold path length.

In some embodiments, the secondary workload agent may be identified by evaluating a selection function that mathematically evaluates the workload parameters.

For example, the secondary workload agent may be selected as the workload agent that maximizes a weight adjust factor (WAF) output by a function having the form:

$$WAF = \sqrt{\frac{w_1 M_1^2 + w_2 M_2^2 + w_3 M_3^2 + \ldots + w_N M_N^2}{w_1 + w_2 + w_3 + \ldots + w_N}}$$

where $M_1 \ldots M_N$ are workload parameters, and $w_1 \ldots w_N$ are weights assigned to the respective workload parameters. The weighted selection function produces a WAF value that is based at least in part on the relative values of the workload parameters, as indicated by the weights $w_1 \ldots w_N$. The weights may be assigned by the broker component 104. Moreover, the weights may be dynamically modified in response to feedback from the agents provided to the data collection function 106.

TABLE 1

Example of Workload parameters and associated weights

| Workload parameter | Weight | Value (normalized) |
|---|---|---|
| Workload capacity | 1.0 | 80 |
| Available CPU percentage | 0.8 | 60 |
| Available memory | 0.6 | 90 |
| Available throughput | 1.0 | 50 |

An example of workload parameters and associated weights, along with example values of the workload parameters, is shown in Table 1. The values of the workload parameters may be normalized values, percentages or raw values. Using the values in Table 1, which are normalized values, the WAF function shown above evaluates as follows:

$$WAF = \sqrt{\frac{(1.0)(80)^2 + (0.8)(60)^2 + (0.6)(90)^2 + (1.0)(50)^2}{1.0 + 0.8 + 0.6 + 1.0}} = 69.96$$

This WAF value may be compared to the WAF values of other candidate secondary workload agents to determine which of the candidate secondary workload agents should be selected as the secondary workload agent.

In some embodiments, the weights may be chosen so that the sum of weights is equal to unity. In that case, the following equation may be used to calculate WAF:

$$WAF = \frac{\sqrt{w_1 M_1^2 + w_2 M_2^2 + w_3 M_3^2 + \ldots + w_N M_N^2}}{w_1 + w_2 + w_3 + \ldots + w_N}.$$

Figure 4:
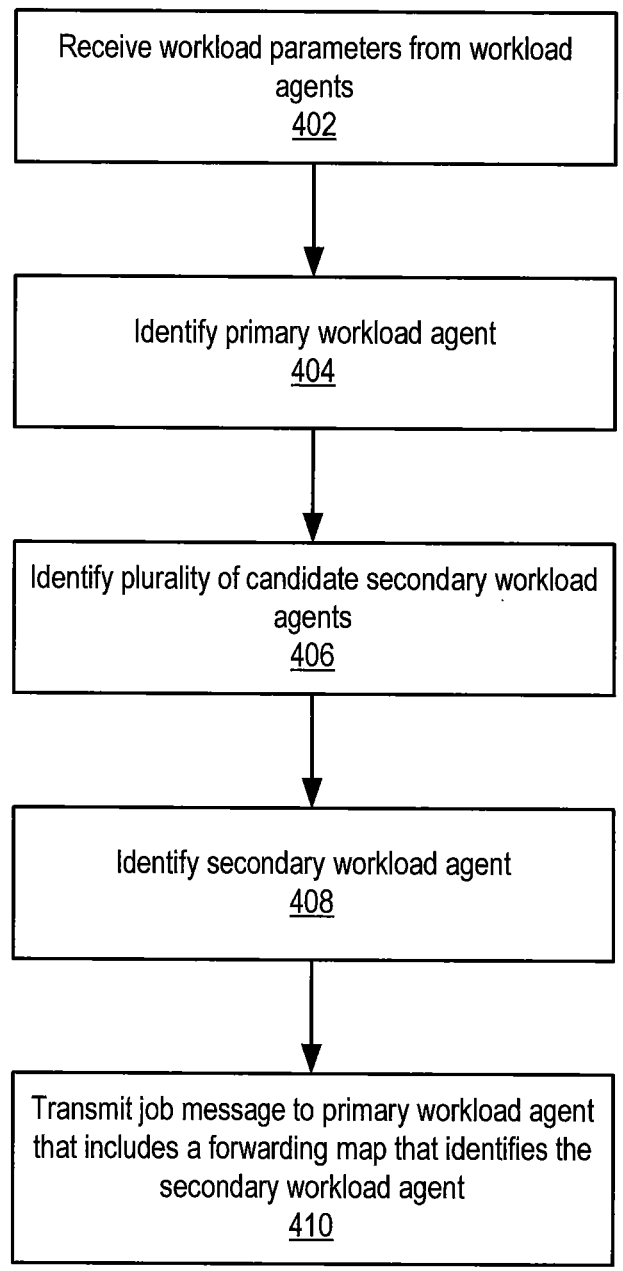
FIGS. 4-7 are flowcharts illustrating operations of systems/methods in accordance with some embodiments of the inventive concepts.

Operations of selecting candidate workload agents according to some embodiments are illustrated in the flowchart of FIG. 4. As shown therein, workload parameters are received from subscribed workload agents (block 402). As noted above, the workload parameters may include factors, such as workload capacity, available CPU percentage, available memory, and/or available throughput. When a job is to be scheduled by the job scheduler component 102 of the workload scheduling computer 100, the job scheduler component 102 first identifies a primary workload agent to perform the job (block 404). The job scheduler component 102 or the broker component 104 may then identify a plurality of candidate secondary workload agents from among the subscribed workload agents (block 406).

The job scheduler component 102 or the broker component 104 then selects a secondary workload agent from among the candidate secondary workload agents (block 408). Finally, a job message is transmitted to the primary workload agent by either the job scheduler component 102 or the broker component 104 (block 410). The job message includes a forwarding map that identifies the secondary workload agent.

Figure 5:
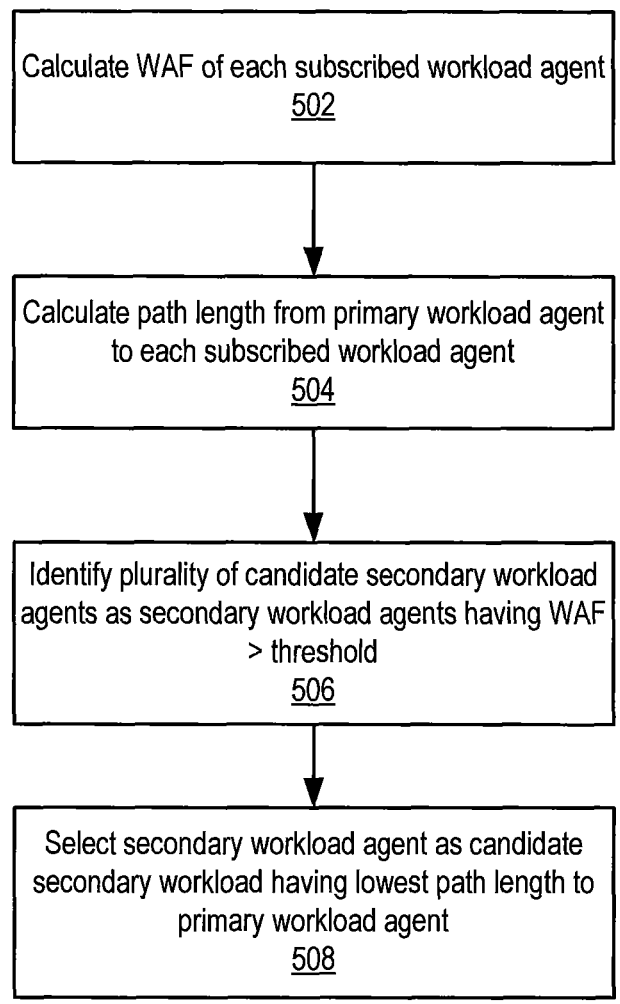
Figure 6:
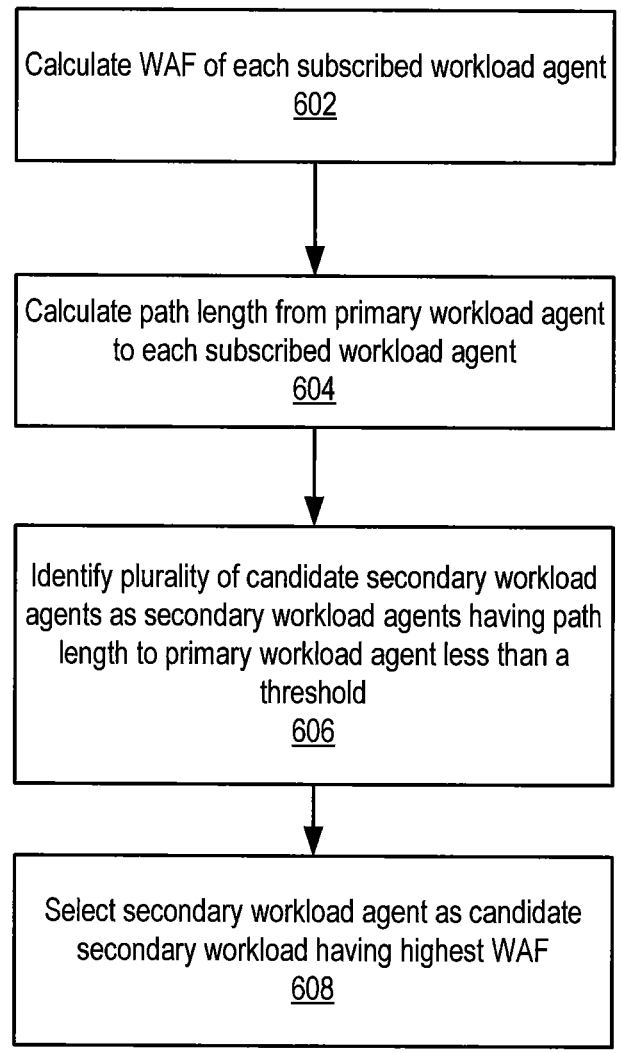

The identification of the candidate secondary workload agents and the selection of the secondary workload agent from among the candidate secondary workload agents can be performed in a number of ways, as illustrated in FIGS. 5 and 6.

Referring to FIG. 5, a value of WAF may be calculated for each subscribed workload agent (block 502). In some embodiments, the broker component 104 may keep track of the WAF of each subscribed workload agent based on data reported to the data collection component 106 by the workload agents 120. Such data may be reported by the workload agents 120, for example, at regular intervals, in response to asynchronous queries by the data collection component 106, the broker 104, and/or along with responses to job requests.

The broker component 104 calculates a path length from the primary workload agent to each of the subscribed workload agents (block 504). As noted above, the path length may be determined based on a number of communication nodes between the primary workload agent and each of the subscribed workload agents, based on a bandwidth of communication channels between the primary workload agent and the subscribed workload agents, based on a round trip time (RTT) of messages between the primary workload agent and the subscribed workload agents, or in other ways. One approach that can be used to measure distance over computer network is hop count, which refers to the number of intermediate nodes (such as routers, switches, gateways, etc.) through which data must pass between source and destination.

A simple hop count does not take into consideration the speed, load, reliability, or latency of any particular hop, but merely the total count. Accordingly, in some embodiments, the path length may be calculated as the sum of hops, where each hop is weighted based on factors, such as speed and/or latency. For example, path length L may be calculated as follows:

$$L = \sum_i \frac{h_i S_i}{l_i}$$

where $h_i$ is a weight of the ith hop, $S_i$ is the speed of the ith hop (e.g., in Mbps), and $l_i$ is the latency of the ith hop (e.g., in milliseconds). For example, assuming that there are two hops between a primary agent and a secondary agent having the characteristics shown in Table 2:

TABLE 2

Example of hop parameters and weights

| Hop | Weight | Speed (Mbps) | Latency (ms) |
|---|---|---|---|
| 1 | 1.0 | 5 | 2 |

TABLE 2-continued

Example of hop parameters and weights

| Hop | Weight | Speed (Mbps) | Latency (ms) |
|---|---|---|---|
| 2 | 1.0 | 10 | 5 | then the path length L may be calculated as:

$$L = \frac{(1.0)(5)}{2} + \frac{(1.0)(10)}{5} = 4.5$$

This path length may be compared to path lengths towards other agents.

The broker component 104 then identifies a group of candidate secondary workload agents from among the subscribed workload agents as those ones of the subscribed workload agents that have a value of WAF that exceeds a predetermined threshold (block 506). The broker component 104 may then select the candidate secondary workload agent that has the shortest path length to the primary workload agent to be the secondary workload agent (block 508).

In other embodiments, referring to FIG. 6, a value of WAF may be calculated for each subscribed workload agent (block 602). The broker component 104 calculates a path length from the primary workload agent to each of the subscribed workload agents (block 604).

The broker component 104 then identifies a group of candidate secondary workload agents from among the subscribed workload agents as those ones of the subscribed workload agents that have a path length to the primary workload agent that is less than a predetermined threshold (block 606). The broker component 104 may then select the candidate secondary workload agent that has the highest WAF to be the secondary workload agent (block 608).

In some embodiments, the candidate secondary workload agents may be identified as those workload agents for which each of the workload parameters is greater than a respective threshold level. That is, the candidate secondary workload agents may include only those workload agents that have sufficient resources to perform the data processing task that is to be assigned to the primary workload agent.

For example, candidate secondary workload agents may be identified as those workload agents for which $M_1 \geq M_{1,t}, \ldots, M_N \geq M_{N,t}$ where $M_n$ is the nth workload parameter, and $M_{n,t}$ is the threshold value of the nth workload parameter.

Figure 7:
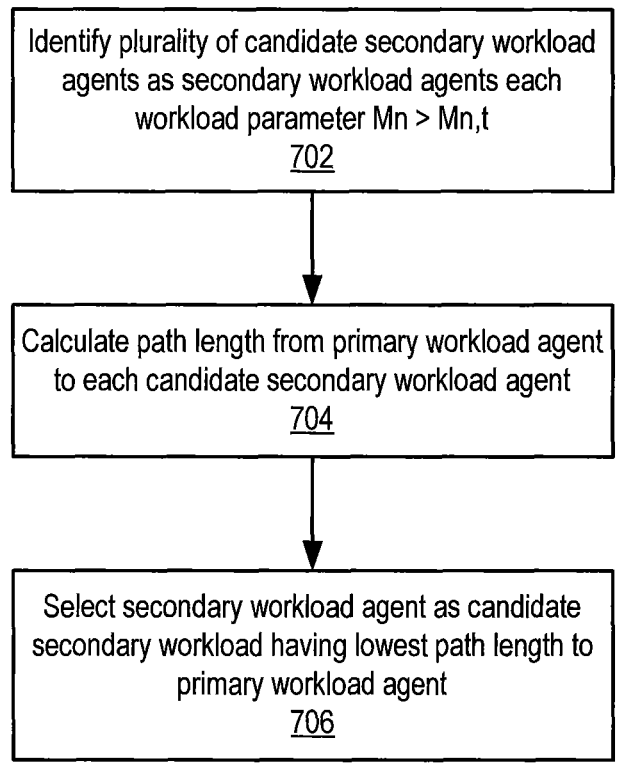

For example, referring to FIG. 7, the broker component 104 may identify those workload agents for which $M_1 \geq M_{1,t}, \ldots, M_N \geq M_{N,t}$ as the candidate secondary workload agents (block 702). The broker component 104 may calculate path lengths from the candidate secondary workload agents to the primary workload agent (block 704), and select as the secondary workload agent the candidate secondary workload agent that has the shortest path length to the primary workload agent (block 706).

According to further embodiments, the candidate secondary workload agents may also be selected based on information associated with the expected workload of a particular job. Such information is referred to herein as "job workload information." The broker component 104 may receive receiving job workload information relating to the data processing task to be assigned to the primary workload agent, and the candidate secondary workload agent may be selected based on the job workload information.

The job workload information may characterize a level of resources required by the data processing task that is to be assigned to the primary workload agent. In particular, the job workload information may be used as the threshold values in the selection procedure illustrated in FIG. 7. For example, a particular job may have requirements for CPU availability, memory availability and throughput. In that case, the requirements for CPU availability, memory availability and throughput of the job may be used as the thresholds $M_{n,t}$ for identifying the candidate secondary workload agents in block 702, as discussed above.

The operations described above may be repeated to select a tertiary workload agent, a quaternary workload agent, etc. If a tertiary workload agent is selected, the forwarding map may identify the secondary workload agent and the tertiary workload agent.

Figure 8:
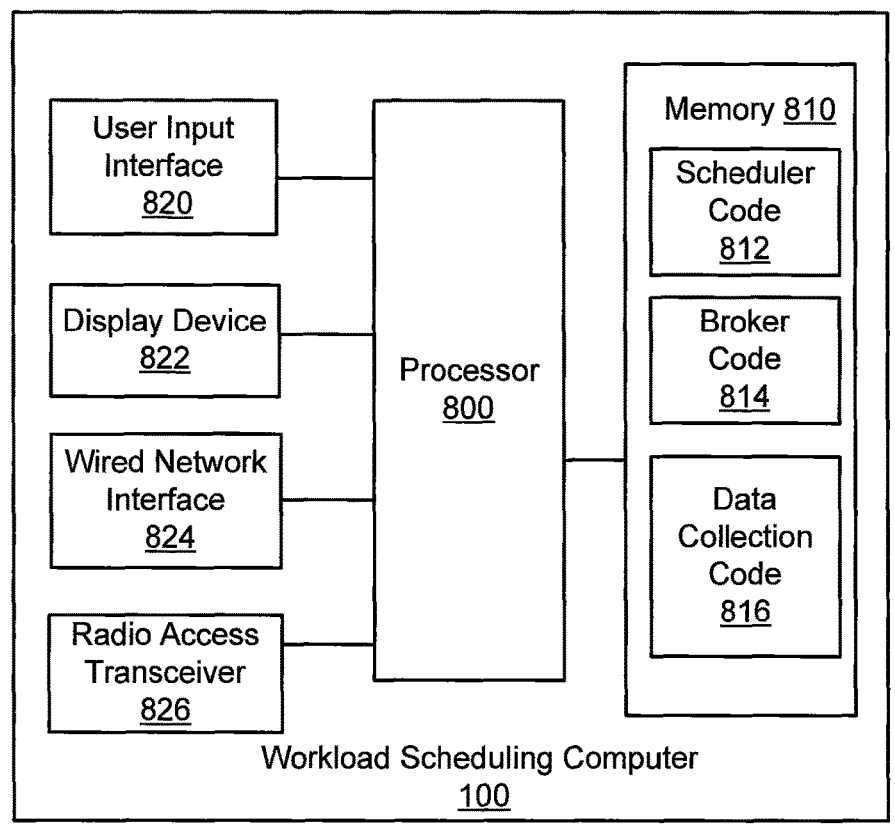
FIG. 8 is a block diagram of a computing system which can be configured as a workload scheduling computer according to some embodiments of the inventive concepts.

FIG. 8 is a block diagram of a device that can be configured to operate as the workload scheduling computer 100 according to some embodiments of the inventive concepts. The workload scheduling computer 100 includes a processor 800, a memory 810, and a network interface which may include a radio access transceiver 826 and/or a wired network interface 824 (e.g., Ethernet interface). The radio access transceiver 826 can include, but is not limited to, a LTE or other cellular transceiver, WLAN transceiver (IEEE 802.11), WiMax transceiver, or other radio communication transceiver via a radio access network.

The processor 800 may include one or more data processing circuits, such as a general purpose and/or special purpose processor (e.g., microprocessor and/or digital signal processor) that may be collocated or distributed across one or more networks. The processor 800 is configured to execute computer program code in the memory 810, described below as a non-transitory computer readable medium, to perform at least some of the operations described herein as being performed by an application analysis computer. The computer 800 may further include a user input interface 820 (e.g., touch screen, keyboard, keypad, etc.) and a display device 822.

The memory 810 includes computer readable code that configures the workload scheduling computer 100 to implement the job scheduler component 102, the broker component 104, and the data collection component 106. In particular, the memory 810 includes scheduler code 812 that configures the workload scheduling computer 100 to implement the job scheduler component 102, broker code 814 that configures the workload scheduling computer 100 to implement the broker component 104, and data collection code 814 that configures the workload scheduling computer 100 to implement the data collection component 106.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
performing operations as follows on a processor of a workload scheduling computing device:
receiving, via a communication network, a plurality of workload parameters from a plurality of workload agents in communication with the workload scheduling computing device, wherein the workload parameters relate to available capacities of the plurality of workload agents and wherein the workload agents comprise computing nodes configured to perform data processing tasks;
identifying a primary workload agent from the plurality of workload agents based on at least one of the plurality of workload parameters;
identifying a plurality of candidate secondary workload agents from among the plurality of workload agents, wherein identifying the candidate secondary workload agents comprises identifying workload agents for which each of the workload parameters is greater than a respective threshold level;
identifying a secondary workload agent from among the plurality of candidate secondary workload agents based on the plurality of workload parameters that are greater than the respective threshold level and an evaluation of a selection function that mathematically evaluates the plurality of workload parameters to select a workload agent from among the candidate secondary workload agents; and
transmitting, via the communication network, a job message that contains a command for the primary workload agent to perform a data processing task, wherein the job message includes a forwarding map that identifies the secondary workload agent and that enables the primary workload agent to perform the data processing task using resources of the secondary workload agent without disrupting future operations of the workload scheduling computing device;
wherein the selection function comprises a weight adjusted function based on a root mean square of a weighted mean of the plurality workload parameters, wherein weights of the weighted mean are assigned to each of the respective workload parameters.

2. The method of claim 1, wherein the plurality of workload parameters comprises a workload capacity, and wherein identifying the primary workload agent from among the plurality of workload agents comprises determining which of the plurality of workload agents has a lowest workload capacity.

3. The method of claim 1, wherein identifying the plurality of candidate secondary workload agents comprises determining path lengths from the primary workload agent to the plurality of workload agents based on a number of communication nodes between the primary workload agent and each of the plurality of workload agents, and selecting workload agents having a path length to the primary workload agent that is less than a threshold path length as the candidate secondary workload agents.

4. The method of claim 3, wherein identifying the plurality of candidate secondary workload agents further comprises receiving job workload information relating to the data processing task to be assigned to the primary workload agent, and selecting the candidate secondary workload agents in response to the job workload information.

5. The method of claim 4, wherein the job workload information characterizes a level of resources required by the data processing task that is to be assigned to the primary workload agent.

6. The method of claim 5, wherein identifying the candidate secondary workload agents comprises selecting only those workload agents of the plurality of workload agents that have sufficient resources to perform the data processing task that is to be assigned to the primary workload agent.

7. The method of claim 1, wherein the plurality of workload parameters comprise an available CPU metric, an available memory metric, an available workload capacity metric, and/or an available throughput metric.

8. The method of claim 1, wherein the selection function maximizes a weight adjust factor (WAF) output by a function based on:

$$WAF = \sqrt{\frac{w_1 M_1^2 + w_2 M_2^2 + w_3 M_3^2 + \ldots + w_N M_N^2}{w_1 + w_2 + w_3 + \ldots + w_N}}$$

where $M_1 \ldots M_N$ are workload parameters, $w_1 \ldots w_N$ are weights assigned to the respective workload parameters.

9. The method of claim 8, wherein identifying the candidate secondary workload agents comprises identifying workload agents for which $M_n > M_{n,t}$ for each of N workload parameters, where $M_n$ is the value of the nth workload parameter of the workload agent, and $M_{n,t}$ is the threshold level for the nth workload parameter.

10. The method of claim 1, further comprising:
identifying a plurality of candidate tertiary workload agents from among the plurality of workload agents; and
identifying a tertiary workload agent from among the plurality of candidate tertiary workload agents based on the plurality of workload parameters;
wherein the forwarding map identifies the secondary workload agent and the tertiary workload agent, and wherein the job message contains a command for the primary workload agent to perform the data processing task using resources of the secondary workload agent and the tertiary workload agent.

11. A workload scheduling computer system, comprising:
a processor; and
a memory coupled to the processor, the memory comprising computer readable program code embodied therein that, when executed by the processor, causes the processor to perform operations comprising:

receiving, via a communication network, a plurality of workload parameters from a plurality of workload agents in communication with the workload scheduling computing device, wherein the workload parameters relate to available capacities of the plurality of workload agents and wherein the workload agents comprise computing nodes configured to perform data processing tasks;

identifying a primary workload agent from the plurality of workload agents based on at least one of the plurality of workload parameters;

identifying a plurality of candidate secondary workload agents from among the plurality of workload agents, wherein identifying the candidate secondary workload agents comprises identifying workload agents for which each of the workload parameters is greater than a respective threshold level;

identifying a secondary workload agent from among the plurality of candidate secondary workload agents based on the plurality of workload parameters that are greater than the respective threshold level and an evaluation of a selection function that mathematically evaluates the plurality of workload parameters to select a workload agent from among the candidate secondary workload agents; and transmitting, via the communication network, a job message that contains a command for the primary workload agent to perform a data processing task, wherein the job message includes a forwarding map that identifies the secondary workload agent and that enables the primary workload agent to perform the data processing task using resources of the secondary workload agent without disrupting future operations of the workload scheduling computing device;

wherein the selection function comprises a weight adjusted function based on a root mean square of a weighted mean of the plurality workload parameters, wherein weights of the weighted mean are assigned to each of the respective workload parameters.

12. A method of assigning data processing tasks to workload agents, comprising:

performing operations as follows on a processor of a workload scheduling computing device:

receiving, via a communication network, a plurality of workload parameters from a plurality of workload agents in communication with the workload scheduling computing device, wherein the workload parameters relate to available capacities of the plurality of workload agents;

identifying a primary workload agent from the plurality of workload agents based on at least one of the plurality of workload parameters, wherein the plurality of workload parameters comprises a workload capacity, and wherein identifying the primary workload agent comprises determining which of the plurality of workload agents has a lowest workload capacity;

identifying a plurality of candidate secondary workload agents from among the plurality of workload agents by determining path lengths from the primary workload agent to the plurality of workload agents based on a number of communication nodes between the primary workload agent and each of the plurality of workload agents and selecting workload agents having a path length to the primary workload agent that is less than a threshold path length as the candidate secondary workload agents;

identifying a secondary workload agent from among the plurality of candidate secondary workload agents by evaluating a selection function based on:

$$WAF = \sqrt{\frac{w_1 M_1^2 + w_2 M_2^2 + w_3 M_3^2 + \ldots + w_N M_N^2}{w_1 + w_2 + w_3 + \ldots + w_N}}$$

where $M_1 \ldots M_N$ are the workload parameters associated with respective ones of the candidate secondary workload agents, $w_1 \ldots w_N$ are weights assigned to the respective workload parameters, and WAF refers to weight adjusted factors; and transmitting, via the communication network, a job message that commands the primary workload agent to perform a data processing task, wherein the job message includes a forwarding map that identifies the secondary workload agent and that enables the primary workload agent to perform the data processing task using resources of the secondary workload agent without disrupting future operations of the workload scheduling computing device.

13. The method of claim 12, wherein the plurality of workload parameters comprise an available CPU metric, an available memory metric, and/or an available throughput metric.

14. The method of claim 12, wherein identifying candidate secondary workload agents comprises identifying workload agents for which each of the workload parameters is greater than a respective threshold level.

15. The method of claim 12, wherein identifying the primary workload agent comprises identifying one of the plurality of workload agents that has a lowest workload capacity.

16. The method of claim 15, wherein the job workload information characterizes a level of resources required by the data processing task that is to be assigned to the primary workload agent; and wherein selecting the candidate secondary workload agents comprises selecting only those workload agents of the plurality of workload agents that have sufficient resources to perform the data processing task that is to be assigned to the primary workload agent.

* * * * *